United States Patent
Townend

[15] 3,656,302
[45] Apr. 18, 1972

[54] MULTIPLE JET, AIRCRAFT ENGINE EXHAUST INSTALLATION

[72] Inventor: Lionel Henry Townend, Farnborough, England

[73] Assignee: Minister of Technology in Her Britannic Majesty's Government of the United Kingdom of Great Britain and Northern Ireland, London, England

[22] Filed: Aug. 11, 1970

[21] Appl. No.: 62,989

[30] Foreign Application Priority Data

Aug. 11, 1969 Great Britain..................40,079/69

[52] U.S. Cl..................60/261, 60/224, 60/263, 60/271, 244/130
[51] Int. Cl.................F02k 3/10, F02k 3/12, F02k 1/06
[58] Field of Search..............60/261, 271, 263, 224, 231; 244/130

[56] References Cited

UNITED STATES PATENTS

| | | | |
|---|---|---|---|
| 3,443,757 | 5/1969 | Townend | 60/231 X |
| 3,424,383 | 1/1969 | Kitson et al. | 60/271 |
| 2,934,894 | 5/1960 | Lang | 60/261 |
| 2,589,548 | 3/1952 | Imbert | 60/224 |
| 3,034,294 | 5/1962 | Brown | 60/241 X |

*Primary Examiner*—Mark M. Newman
*Attorney*—Stevens, Davis, Miller & Mosher

[57] ABSTRACT

A multiple jet, aircraft engine exhaust installation comprising at least two engine exhaust nozzles, aircraft structure joining said exhaust nozzles, means for supplying fuel to be burnt at a region immediately aft of said joining aircraft structure, outlet orifices terminating said exhaust nozzles at exit planes, said exit planes being convergent in the upstream sense, ducts defining an outlet passage for exhaust gases in said nozzles and extending from duct throats within said nozzles to said outlet orifices and wherein said ducts are shaped in accordance with the supersonic Prandtl-Meyer flow theory of supersonic expansion.

13 Claims, 6 Drawing Figures

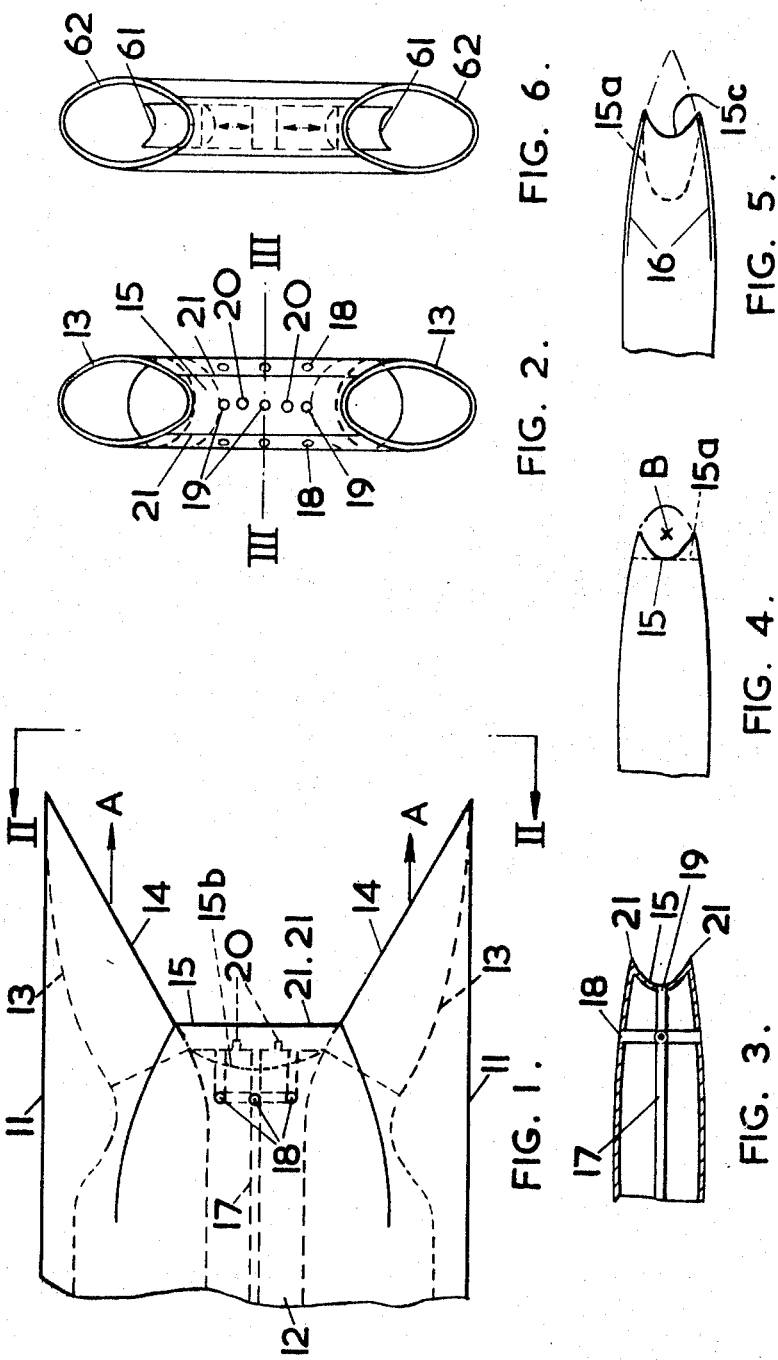

MULTIPLE JET, AIRCRAFT ENGINE EXHAUST INSTALLATION

This invention relates to multiple jet, aircraft engine exhaust installations of the kind in which at least two engine exhaust nozzles are conjoined by part of associated structure.

Except at flight speeds well below a supersonic design value, the exhaust flows from such nozzles are usually supersonic.

In aircraft engine exhaust installations of this kind the conjoining structure terminates at its aft or downstream end between the nozzles forward of, at or downstream of the exit orifices of the exhaust nozzles which in general lie in planes normal to the direction of exhaust flow from the nozzles.

It is known that among the disadvantages of this kind of installation are (1) the drag which results as a consequence of low pressure in the region immediately downstream of the conjoining structure and (2) the desirability of providing means whereby the exit area of the exhaust nozzles may be varied so that more nearly ideal flow conditions may be obtained within the exhaust nozzles at varying flight speeds, the provision of such means necessarily leading to design complications, weight penalties and to regions of low pressure around the exhaust jets and so to additional base drag.

The object of the invention is to provide an improved aircraft engine installation of the kind referred to having improved flight characteristics.

A multiple jet, engine exhaust installation of the kind referred to according to the present invention has provision for burning a fuel/air mixture at the region immediately aft of the conjoining structure between the exhaust nozzles, the exhaust nozzle orifices being formed with their exit planes convergent in the upstream direction and the exhaust nozzle ducts which extend from their respective nozzle throats within the installation to the nozzle orifices having surfaces shaped in accordance with the two or three dimensional supersonic Prandtl-Meyer flow theory of supersonic expansion.

A supersonic exhaust nozzle having nozzle lobes shaped internally in this manner is disclosed in British Pat. No. 1132236.

The effect of burning the fuel air mixture in the region aft of the conjoining aircraft structure is to raise the pressure in this region with a consequent reduction of base drag which rise in pressure may in fact be such that there is an actual forward thrust on the conjoining aircraft structure.

The shaping of the exhaust nozzle ducts and the presence of the base flow between them eliminate the necessity of providing variable exit area exhaust nozzles since each exhaust jet is bounded on one side by a free jet boundary. Variation of the internal throat area of the nozzles or the nozzle areas downstream of the throats and within the ducts remains desirable and is described below.

It is convenient to form the aft region of the conjoining structure between the nozzles as a bluff but not necessarily plane aft facing wall or surface, which if plane may be normal to the direction of the exhaust flow when fully expanded, and with this arrangement provision may be made for injecting fuel through this wall directly into the region downstream thereof or around its periphery.

Fuel may also be injected into the airstream upstream of the rear end of the conjoining aircraft structure to form a fuel/air mixture which is burnt in or adjacent the region aft of the conjoining structure alone or together with fuel injected through the aft facing wall or around its periphery.

Ignition of the fuel/air mixture may be obtained as a result of its contact and mixing with hot exhaust gases issuing from the exhaust nozzles and/or by the provision of igniters such as glow plugs within the region where the fuel/air mixture is formed. Ignition of fuel injected upstream of the rear end may also be initiated at or upstream of the rear end by igniters and/or by contact with an existing region of burning at the rear end.

It is desirable that the nozzle throats should be of circular cross section since the pressure and temperature of the exhaust flow there is very high in which case nozzle ducts designed on two-dimensional Prandtl-Meyer theory will each have an exhaust nozzle orifice which is plane and is of elliptical shape. Where the exit orifices join with the aft region of the conjoining structure and with a view to avoiding a structural arrangement which would lead to geometric complications, the aft wall of the conjoining structure is recessed in concave fashion to conform with the inner end regions of the nozzle exit orifices. The recessed structure may be three dimensionally curved or cylindrical and the concavity encourages ignition, the intensity and maintenance of burning once ignition has taken place and also reduces base drag when no fuel is injected.

One arrangement of an aircraft engine twin exhaust installation according to the invention is illustrated by the accompanying diagrammatic drawings of which:

FIG. 1 is a plan view,
FIG. 2 is an end view on the line II—II of FIG. 1,
FIG. 3 is a cross section view on the line III—III of FIG. 2,
and FIGS. 4, 5 and 6 show design details of modifications.

A pair of aircraft jet engine exhaust after bodies is shown at 11 with conjoining aircraft structure 12 and the direction of exhaust flow from the engines at design conditions is shown by the arrows A. The after-bodies 11 have outlet ducts 13 which are cut off at their downstream ends so that their exits lie in planes 14 which are convergent in the upstream direction. The walls of the outlet ducts 13 are three-dimensional surfaces shaped in accordance with two-dimensional Prandtl-Meyer supersonic flow theory. The downstream end region of the structure 12 is recessed as shown at 15, FIG. 3. A fuel line 17 is supplied with fuel from a pump (not shown) from which fuel passes through nozzles 18 at the upper and lower faces of the structure 12 and further nozzles 19 in the recess 15. Igniter plugs 20 are also provided in the recess 15. Further, or alternatively, fuel may be injected through slits or holes along edges 21 at the lips of recess 15.

In operation fuel is ejected through the nozzles 18 and/or 19 and/or through 21 and the resulting fuel/air mixture is ignited by the igniter plugs 20 and/or by contact with the hot exhaust gases issuing from the outlet ducts 13. Ignition of fuel injected at 18 may be achieved by contact with flame already established in the region downstream of 15. Burning takes place in the region of the aft end of the structure 12 and in the region downstream of the recess 15. The resulting pressure rise reduces the base drag which would otherwise occur and may in fact provide thrust. The shaping of the outlet ducts 13 and the cut off arrangement at their downstream end results in efficient flow conditions within the ducts even when the nozzles are not operating at their design condition. For example the configuration shown at FIGS. 1, 2 and 3 is drawn to scale for exhaust flows of Mach 2.0 but at transonic flight speeds when the need for relief of base drag is high, efficient flow within the ducts is still maintained due to the presence of a free air or flame boundary along the exhaust jets.

Advantages which accrue by the use of the invention are:
1. Efficient exhaust flow conditions are obtained at other than optimum design speed, and
2. The need for mechanical equipment for mechanical variation of the nozzle outlets is obviated.

For operation at some, especially low subsonic flight speeds, the recessed base 15 may be less desirable in terms of unrelieved base drag than a convex base configuration. To avoid this disadvantage the base may be made to have variable geometry as shown at FIGS. 4 and 5. As shown at FIG. 4, the recess 15 is supported about a hinge axis B and is movable by means not shown between a concave condition as shown in full lines to a convex condition as shown in dotted lines and vice versa. An alternative arrangement is shown at FIG. 5 in which sliding plates 16 can be moved by means not shown from a retracted condition as shown in full lines to an extended condition as shown in dotted lines and vice versa.

The area of the nozzle throats may be varied by the provision of sliding plates (not shown) which may be extended and retracted to vary the area of the nozzle throats.

The burning of a fuel/air mixture to reduce base drag by raising the pressure in the region immediately downstream of the conjoining structure will in general be limited to aircraft speeds in excess of about Mach No. 0.7.

It is to be noted that the end region of the structure 12 shown recessed at 15 may comprise a flat wall as shown at 15a, FIG. 4, a curved wall as shown at 15b, FIG. 1 or a curved recessed wall as shown at 15c, FIG. 5.

As stated above it may be desirable to make provision for varying the throat area of the nozzles or the nozzle areas downstream of the throats and within the ducts. One arrangement by which this can be achieved is illustrated at the accompanying FIG. 6 which is an end view looking forward similar to FIG. 2. As shown two slidable plates 61, associated respectively with ducts 62 are movable in both senses between positions as shown in full lines in which they effectively reduce the area of the ducts and retracted positions shown in dotted lines in which the duct areas are not restricted. Means (not shown) for moving the plates may for example comprise an hydraulic jack and appropriate linkage under the control of the pilot.

A similar effect may be achieved by the use of hinged plates as in the so called eyelid constructions used at the after burner region of jet engines.

I claim:

1. A multiple jet, aircraft engine exhaust installation comprising at least two engine exhaust nozzles, aircraft structure joining said exhaust nozzles, means for supplying fuel to be burnt at a region immediately aft of said joining aircraft structure, outlet orifices terminating said exhaust nozzles at exit planes, said exit planes being convergent in the upstream sense, ducts defining an outlet passage for exhaust gases in said nozzles and extending from duct throats within said nozzles to said outlet orifices and wherein said ducts are shaped in accordance with the supersonic Prandtl-Meyer flow theory of supersonic expansion.

2. A multiple jet, aircraft engine exhaust installation as claimed in claim 1 wherein said joining aircraft structure has a bluff aft facing wall, means defining orifices for fuel extend through said wall and having means for injecting fuel through said orifices into the region downstream of said aft facing wall.

3. A multiple jet, aircraft engine exhaust installation as claimed in claim 2 wherein said bluff aft facing wall is concave at its aft face.

4. A multiple jet aircraft engine exhaust installation as claimed in claim 2 and having means defining orifices for fuel which extend to the outer surface of said aircraft structure upstream of said aft facing wall and means for injecting fuel through said orifices upstream of said aft facing wall.

5. A multiple jet, aircraft engine exhaust installation as claimed in claim 4 and wherein said aft facing wall is concave at its aft face.

6. A multiple jet, aircraft engine exhaust installation as claimed in claim 1 and wherein the duct throats are of circular cross section.

7. A multiple jet, aircraft engine exhaust installation as claimed in claim 5 and wherein the duct throats are of circular cross section.

8. A multiple jet, aircraft engine exhaust installation as claimed in claim 1 having means for varying the throat area of the nozzle ducts.

9. A multiple jet, aircraft engine exhaust installation as claimed in claim 1 having means for varying the area of the nozzle ducts downstream of the duct throats within the nozzles.

10. A multiple jet, aircraft engine exhaust installation as claimed in claim 9 wherein said means comprise a slidable plate associated with each nozzle duct, means supporting said plate on said aircraft structure and means for moving said sliding plate between an extended position in which the area of the duct is restricted and a retracted position in which the area of the duct is not restricted.

11. A multiple jet, aircraft engine exhaust installation as claimed in claim 7 having means for varying the area of the nozzle ducts downstream of the duct throats within the nozzles and wherein said means comprise a slidable plate associated with each nozzle duct, means supporting said plate on said aircraft structure and means for moving said sliding plate between an extended position in which the area of the duct is restricted and a retracted position in which the area of the duct is not restricted.

12. A multiple jet, aircraft engine exhaust installation as claimed in claim 1 having ignition means operable to encourage ignition and burning of fuel at said region downstream of said joining aircraft structure.

13. A multiple jet, aircraft engine exhaust installation as claimed in claim 11 and having ignition means operable to encourage ignition and burning of fuel at said region downstream of said joining aircraft structure.

* * * * *